United States Patent [19]

Schmid et al.

[11] Patent Number: 4,906,971
[45] Date of Patent: Mar. 6, 1990

[54] CONTROL FOR DIGITAL DISPLAY UNIT

[75] Inventors: Mechtilde Schmid, Villingen-Schwenningen; Jürgen Adams, Tannheim; Otto Becker, Trossingen, all of Fed. Rep. of Germany

[73] Assignee: Mannesmann Kienzle GmbH

[21] Appl. No.: 155,065

[22] Filed: Feb. 8, 1988

[30] Foreign Application Priority Data

Feb. 6, 1987 [DE] Fed. Rep. of Germany ... 8701812[U]

[51] Int. Cl.⁴ .............................................. G08B 19/00
[52] U.S. Cl. .................................... 340/462; 200/339; 340/691
[58] Field of Search ...................... 340/52 F, 107, 691, 340/459, 461, 462; 200/339, 307, 303, 153 T, 523, 526, 553, 556; 40/464, 452, 448

[56] References Cited

U.S. PATENT DOCUMENTS

| | | | |
|---|---|---|---|
| 4,045,650 | 8/1977 | Nestor | 200/339 X |
| 4,242,551 | 12/1980 | Sorenson | 200/339 X |
| 4,293,842 | 10/1981 | Tanaka et al. | 340/52 F |
| 4,356,470 | 10/1982 | Kogawa et al. | 340/52 F |
| 4,551,660 | 11/1985 | Suzuki | 200/339 X |
| 4,663,718 | 5/1987 | Augello et al. | 340/52 F X |
| 4,677,429 | 6/1987 | Glotzbach | 340/52 F X |
| 4,760,218 | 7/1988 | Gutman | 200/339 X |

FOREIGN PATENT DOCUMENTS 1332403  8/1987  U.S.S.R. .

Primary Examiner—Joseph A. Orsino
Assistant Examiner—Brian R. Tumm
Attorney, Agent, or Firm—Toren, McGeady & Associates

[57] ABSTRACT

A control arrangement for a display unit, for use in a motor vehicle for digital presentation of vehicle operational data, is located within a housing having a display face. A multi-way push button is accessible on the display face and extends into the housing for operating at least two switches. The push button is pivotally mounted for operating different ones of the switches when specific operational data is desired.

8 Claims, 2 Drawing Sheets

CONTROL FOR DIGITAL DISPLAY UNIT

BACKGROUND OF THE INVENTION

The present invention is directed to a display unit for digital presentation of motor vehicle operational data and includes at least one switch for continuous scanning of the available operational data and another switch for erasing operational data concerned with a particular part of a vehicle trip.

A display unit of the above type provides operational data in a motor vehicle not available, or not available in sufficient detail from the conventional vehicle instrumentation indicating speed, RPM, fuel and engine temperature. In providing such data, the space available, in the visible range of the driver, is not sufficient for separate display units and it would not be desirable for aesthetic and practical reasons to house a variety of the display units on the instrumentation panel on a dashboard. Further, it is preferable if certain operational data is not continuously displayed, but rather can be scanned when required. If the operational data is used to assist in economical operation of the vehicle, then the data required would be momentary fuel consumption, average fuel consumption, average speed, as well as the distance travelled and the elapsed trip time.

If such a display unit is to be successful, it must be arranged within the visual field of the operator and, in particular, must be installed in the dashboard, that is, the space where the conventional vehicle instrumentation is located and where the additional available space is limited. Moreover, the dimensions of the display unit must correspond to an area on the dashboard selected for reasons of design.

Due to the available space on a dashboard, a display unit of relatively small dimension is required. On the other hand, an easily readable display is needed so that the information can be obtained at a glance and the display is such that it does not divert the driver's attention from traffic conditions and, at the same time, affords a visible display as large as possible.

These contradictory requirements leave very little room for the means for operating the display device. In the known state of the art, at least two keys or buttons are required and they must be arranged in close proximity to one another and with relatively small operating surfaces.

Such an arrangement of the operating means is not very convenient for the vehicle driver, since operation of the unit must take place while driving and without any conscious monitoring of the operating means.

SUMMARY OF THE INVENTION

Therefore, it is the primary object of the present invention to provide operating means for a display unit of the type described above, which is adapted to the small dimensions of the unit and for its utilization in a motor vehicle.

In accordance with the present invention, a single push button or key with a basically rectangularly-shaped operating surface is provided with one dimension of the button being equal to, or larger than, the smaller dimension of the display window of the display unit. Further, the push button is mounted so that it can be pivoted about an axis located within the display unit housing.

A significant advantage of the present invention is that the best possible utilization of the available space is achieved by the use of a single push button which, due to its arrangement, affords the function of three separate buttons, with a considerably reduced use of components. While the space required for a single push button is especially suited for use in a motor vehicle, particularly a truck or a construction machine, there is the additional advantage that it is readily accessible and can be operated blindly, using the thumb. Further, the operating push button affords an inconspicuous opening for the calibration of the display unit and/or for releasing the locked arrangement of the unit housing in the installed state. An appropriate and adequately accessible lead stamp seal for such opening can be provided in the relatively large single push button. In accordance with the present invention, the lead seal is within the field of vision of the driver, and can be checked at any time for damage. The location of the seal, however, does not interfere with the normal operation of the push button and, in addition, has no false signal effect at its location, even if it is conspicuously painted.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 2:
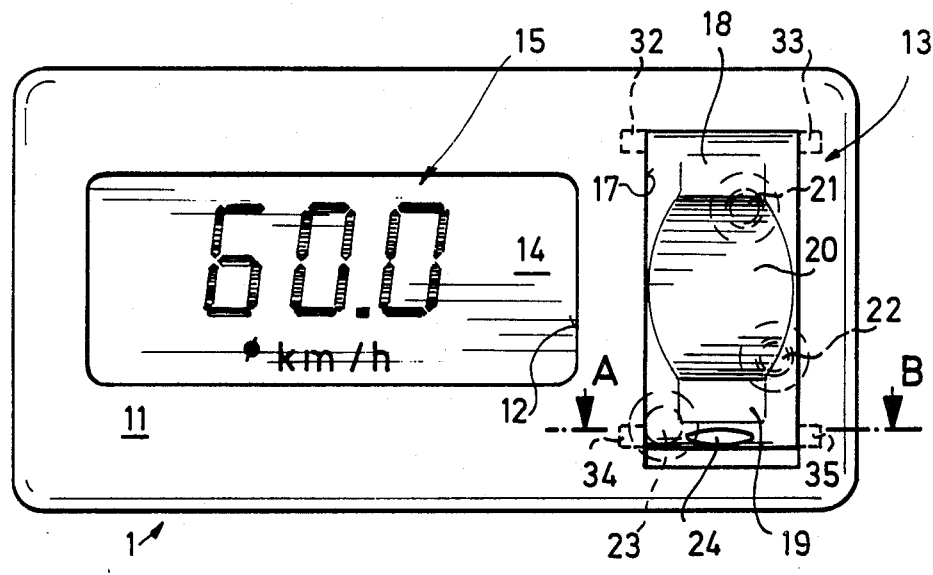
FIG. 2 is a front elevational view of the display unit.
Figure 1:
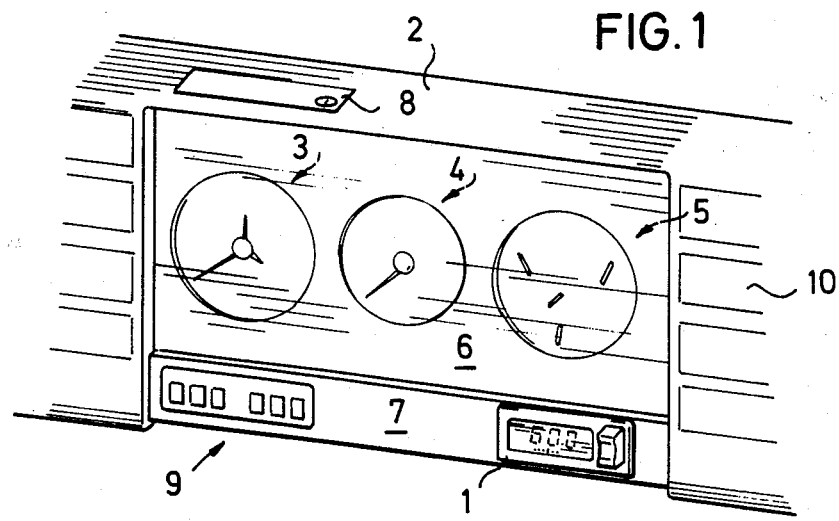
FIG. 1 is a perspective view of a motor vehicle dashboard, incorporating a display unit embodying the present invention.

In FIG. 1, a display unit 1 is shown in a motor vehicle dashboard 2 with conventional instruments 3, 4 and 5, having indicator parts visible behind a common glass plate 6. The glass plate 6 is located in a suitable cutout in a wall member 7 forming part of the dashboard. A lockable cover 8 covers the diagram disk shafts of a tachograph. Keys 9 below the instrument 3 serve, in a known manner, for controlling the working time recording of the tachograph based on the type of operation by the drivers. Blank areas 10 of the dashboard are used for switches or signal elements. As is shown in greater detail in FIG. 2, the display unit 1 has a key 13, relatively large in size as compared with the display window 12, located in the front wall 11 of the housing of the display unit. The key or multi-way push button 13 has one of its dimension in the plane of the front wall 11, larger than the smaller dimension of the display window 12. The display window 12 has a glass plate 14, located in the housing with a liquid crystal display installation 15, located behind the window and mounted on a printed circuit board 16 positioned within the housing.

Figure 5:
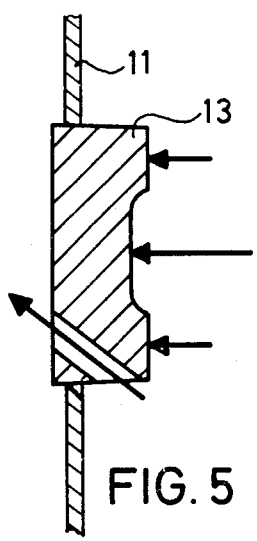
FIG. 5 is a schematic showing of the push button embodied in the display unit, indicating the manner of operating the button.
Figure 4:
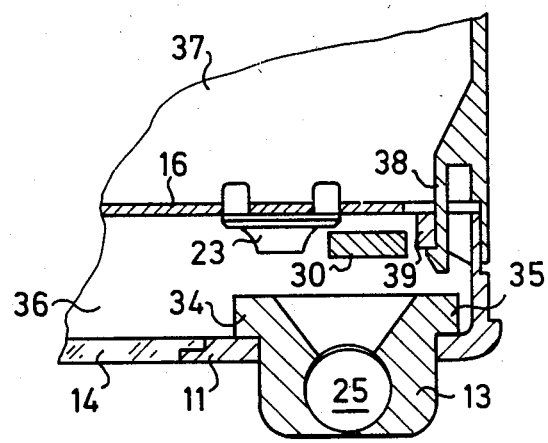
FIG. 4 is a sectional view taken along the line A–B in FIG. 2.

As can be seen in FIGS. 1 and 3-5, the front wall 11 of the housing has an opening 17 through which the push button extends from the inside of the housing. As can be seen best in FIG. 3, the push button has an operating surface facing outwardly from the front wall 11, and the operating surface is concave providing an upper projection 18 and a lower projection 19, separated by an inwardly directed recess or depression 20. Within the housing and spaced inwardly from the push button 13 are switches 21, 22 and 23 fixed to the printed circuit board 16. The switches are in spaced relation, note FIG. 2, with the switch 21 located inwardly from the projection 18, the switch 22 located inwardly of the projection 19, and offset laterally from the switch 21. Switch 23 is located below switch 22, adjacent the opposite side of the push button 13. Accordingly, switch 21 is actuated if the projection 18 on the key 13 is pressed inwardly. Similarly, switch 22 is actuated if the projection 19 on the button 13 is pressed inwardly. As shown in FIG. 5, the arrows directed against the surface of the push button indicate three different functions which can be effected by the push button. If the recess 20 of the key 13 is pressed inwardly, another function of the display unit can be effected. Switch 23 for effecting adjustment and calibration, is operable through an aperture 25 in the lower part of the push button 13, note FIGS. 2–5 and the aperture is closed by a lead stamp seal 24 located in an end wall of the push button 13, not shown in detail. A suitable seat for the seal 24 is shaped in the aperture 25, which widens inwardly, note FIG. 4.

Figure 3:
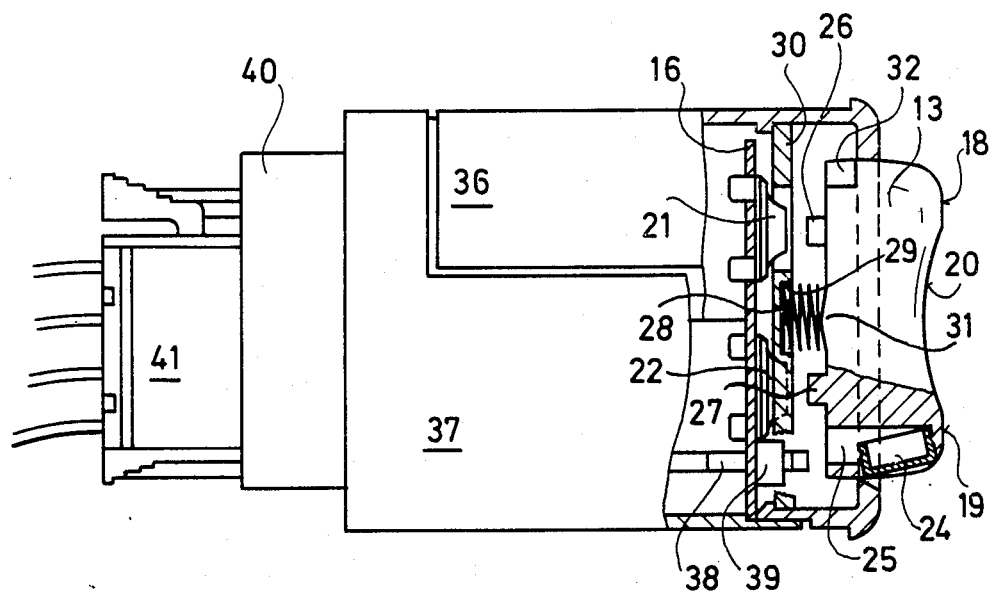
FIG. 3 is a side view, partly in section, of the display unit.

As can be seen in FIG. 3, when the push button 13 is not depressed inwardly, it is in spaced relation to the switches 21, 22. Operation of the switches 21 and 22 is obtained via shafts 26, 27 formed on the inner surface of the push button opposite the operating surface formed by the projections 18, 19 and the recess 20. The push button 13 is displaceably guided in the opening 17 in the front wall 11. The inner face of the push button 13 is biased outwardly by a spring 28. One end of the spring contacts the inner face of the push button 13 and its other end is seated within a cylindrical depression 29 in a web 30, located between the circuit board 16 and the push button 13. The inner face of the push button 13 has a knife edge 31 extending transversely of its longer dimension so that the knife edge affords pivotal movement of the push button relative to the spring 28. At its upper and lower corners, the push button 13 has lateral projections 32, 33, 34 and 35 which press against the inside surface of the front wall 11, bordering the opening 17. It would also be possible to provide continuous ledges in place of the projection. The projections or ledges located inside the front wall 11 serve as axes of rotation when the key 13 is actuated or pressed inwardly in the region of one of the projections 18, 19.

In FIG. 3, it can be noted that the housing of the display unit 1 is made up of two housing parts 36, 37 assembled together in a suitable manner and which retain the printed circuit board 16 when assembled. Lock bolt 38 formed as a part of housing part 37 snaps into an eye or opening 39 in the housing part 36 when the two housing parts are assembled and the bolt 38 locks the two housing parts together. Lock bolt 38 can be released and the housing parts 36, 37 separated without causing any damage, if the lead seal 24 located in the bottom end of the push button 13 is removed and the lock bolt is actuated through the opening 25.

For completeness, it should be noted that the push button 13 must be illuminated in a suitable manner and that receiving means for additional printed circuit boards or flexible circuit carriers are formed in the housing parts 36, 37 and are electrically interconnected and also with the printed circuit board 16. Plug sockets 40 are formed in the rear of the housing part 37 and the web 30 is fixed in the housing part 36 by a suitable clamping action.. One of several connecting plugs 41 is shown at the rear of the housing in FIG. 3. The printed circuit boards serve, among other things, as supports for the electronic actuation means of the liquid crystal display installation 15, as well as for the required memory and possibly computer circuits for further processing of the selected measured data, either supplied directly by transmitters installed in the vehicle or for previously processed measured data supplied by the vehicle instruments.

The selection of the operational data can, in order to achieve a better adaption of the display unit for market conditions, be organized so that the operational data are acquired or computed in several basic measuring units for the same measuring magnitude, by actuating or pressing one part of the push button 13 operating data referring to gallons or miles or liters or kilometers can be scanned and by actuating the other part of the button, operational data referring to a segment of an entire vehicle trip can be erased. By pressing the key in the region of the recess, or depression 20, an erasing function is triggered for operational data, referring to the entire vehicle trip, such as average fuel consumption, elapsed trip time and average speed.

While specific embodiments of the invention have been shown and described in detail to illustrate the application of the inventive principles, it will be understood that the invention may be embodied otherwise without departing from such principles.

We claim:

1. A control arrangement for a display unit for a motorized vehicle for digital presentation of different operational data of the vehicle including a housing having a display face, a digital indication window in said display face having a larger dimension and a smaller dimension, at least one first switch for continuous scanning of available operational data and one second switch for erasing operational data relative to a vehicle trip segment, wherein the improvement comprises a single push button (13) located in said housing and accessible on said display face (11) for operating said first and second switches (21, 22) and said button having a rectangular shape in the plane of said display face and said rectangular shape having one dimensional at least equal to the smaller dimension of said indication window, and said push button being pivotally displaceable inwardly into said housing about an axis extending generally parallel to said display face, said housing having an opening in said display face with a rectangular shape corresponding to the rectangular shape of said button and said button being located in and extending through said opening so as to be guided therein, said button further having laterally extending projections arranged so as to project within said housing and bear against said display face, and further comprising a spring arranged so as to bias said push button in a direction out of said housing.

2. A control arrangement as set forth in claim 1, wherein said push button has a first surface located outwardly from said housing and a second oppositely directed surface located within said housing, said first and second switches (21, 22) being located within said housing inwardly from said second surface of said push button (13), a pair of shafts (26, 27) projecting from said second surface of said push button (13) toward and in space relation to said switches, each of said shafts being aligned with a different one of said switches.

3. A control arrangement as set forth in claim 1, wherein a web (30) is located within said housing spaced inwardly from said push button (13), said spring (28) being in bearing contact with said web and said push button for biasing said push button in the direction out of said housing.

4. A control arrangement as set forth in claim 3, wherein said push button (13) has a surface facing into said housing with a projection extending inwardly from said surface forming a knife edge (31), and said knife edge forming a contact between said spring (28) and said push button (13).

5. A control arrangement as set forth in claim 1, wherein said push button (13) has a first surface facing outwardly from said display face of said housing and a second surface facing oppositely to said first surface and directed inwardly into said housing, an end wall on said push button extending between said first surface and said second surface, an opening (25) in said push button (13) extending from said end wall into the interior of said housing, and a third switch (23) located within said housing and accessible through said opening (25) in said push button (13).

6. A control arrangement as set forth in claim 5, wherein said first surface of said push button (13) extends in the direction of said one dimension and has a first end and a second end, said first surface having a concave shape with a projection at the first end and second ends thereof and a recess located between said ends.

7. A control arrangement as set forth in claim 5, wherein said housing comprising a first housing part (36) and a second housing part (37) and a locking device (38) within said housing for securing said first and second housing parts together, and said locking device (38) being accessible through said opening (25) for releasing said locking device and separating said first and second housing parts.

8. A control Arrangement as set forth in claim 5, wherein a lead stamp seal (24) is located within said opening (25) for closing said opening.

* * * * *